United States Patent [19]
Küpper et al.

[11] Patent Number: 5,779,994
[45] Date of Patent: Jul. 14, 1998

[54] TUBULAR REACTOR

[75] Inventors: Kurt-Manfred Küpper, Bergisch Gladbach; Ulrich Perner, Köln; Axel Bergmann-Franke, Dormagen; Horst Groos, Odenthal, all of Germany

[73] Assignee: Bayer Aktiengesellschaft, Leverkusen, Germany

[21] Appl. No.: 726,037

[22] Filed: Oct. 7, 1996

[30] Foreign Application Priority Data

Oct. 16, 1995 [DE] Germany ................ 195 39 622.7

[51] Int. Cl.$^6$ ................ F28D 21/00; B01J 8/04
[52] U.S. Cl. ................ 422/197; 422/201; 422/202
[58] Field of Search ................ 422/188, 191, 422/193, 196, 197, 201, 202, 198

[56] References Cited

U.S. PATENT DOCUMENTS

| | | | |
|---|---|---|---|
| 2,590,465 | 3/1952 | Ris | 422/197 X |
| 3,158,636 | 11/1964 | Wall, Jr. | 422/197 X |
| 3,335,160 | 8/1967 | Sennwald et al. | 422/197 X |
| 3,490,879 | 1/1970 | Urban | 422/197 |
| 3,595,846 | 7/1971 | Rouzier | |
| 3,773,470 | 11/1973 | Rouzier | |
| 3,898,049 | 8/1975 | Burroughs et al. | |
| 4,102,652 | 7/1978 | Vogl | |
| 4,363,355 | 12/1982 | Prucyk | 165/81 |
| 4,632,587 | 12/1986 | Vollhardt | 422/202 |
| 5,133,941 | 7/1992 | Hays et al. | 422/140 |
| 5,286,455 | 2/1994 | Eilers et al. | 422/110 |
| 5,445,799 | 8/1995 | McCants | 422/146 |

FOREIGN PATENT DOCUMENTS 532325  3/1983  European Pat. Off.

*Primary Examiner*—Nina Bhat
*Attorney, Agent, or Firm*—Joseph C. Gil; Noland J. Cheung

[57] ABSTRACT

A variable tubular reactor is described which contains a plurality of parallel reaction tubes held between two tube plates in a cooling medium container. The reaction tubes are connected outside of the tube plates with 180° bends to form a tubular coil, whereby at least a part of the tube bends are connected to the respective tube ends by releasable flange connections. The reaction tubes are combined in groups in a through-flow relationship by tube bends and are regulated in temperature by a cooling medium supply, which is assigned thereto and is controllable in respect of the cooling medium quantity and/or cooling medium temperature.

15 Claims, 3 Drawing Sheets

Fig. 2    A-A

TUBULAR REACTOR

FIELD OF THE INVENTION

The present invention relates to a tubular reactor, which is adaptable to the requirements of different reactions and therefore can be used in a versatile manner.

BACKGROUND OF THE INVENTION

For the execution of chemical reactions, tubular reactors offer a series of advantages not presently available in other types of reactors. In particular, such reactors are characterized by the following advantages: 1) a short dwell time distribution due to avoidable axial back-mixing (plug flow); 2) good temperature control even in highly exothermic or endothermic reactions due to the favorable ratio of the reactor volume to the reactor surface; 3) substantially complete mixing in the radial direction (plug flow); 4) capability of the reactor for receiving reactions under high pressure due to the small forces being received by the reactor wall; and 5) substantial freedom from servicing due to the absence of movable built-in devices such as agitators, etc.

Prior art commercial tubular reactors, which comprise a tubular coil located in a cooling medium and may possess a length ranging from approximately 100 to 1000 m or more, have the disadvantage that adaptation of dwell time and/or capacity to altered reaction conditions is not possible. Furthermore, if the released heat is dependent upon the progress of the reaction, i.e., a local dependency exists in the axial direction of the reactor, the regulation of temperature cannot be carried out as a function of the progress of the reaction.

Furthermore, tubular reactors are known which consist of a stack of double-walled tubes, having a length of, e.g., 10 to 20 m, wherein the reaction medium flows consecutively through the inner tubes of the stack and the cooling or heating medium is conveyed through the outer tube. The outer tubes of the various tube sections can be supplied under different conditions with cooling medium in accordance with the desired temperature control as a function of the progress of the reaction. Such reactors, however, are generally very costly in structure and are designed for only a specific type of reaction.

SUMMARY OF THE INVENTION

The present invention comprises a tubular reactor, which contains a plurality of reaction tubes held in parallel between at least two tube plates, in which the reaction tubes are connected outside the tube plates by means of 180° tube bends to form a tubular coil. Preferably, at least a number of the tube bends are connected to adjacent tube ends by means of releasable flange connections.

Preferably, the parallel reaction tubes are arranged so that on the tube plates, the reaction tubes form a regular grid in the form of a square or more preferably, an isosceles triangle. Preferably, in each case, at least one group of four tubes is provided with releasable flange connections at least one end, wherein within each group, the tubes are connected in pairs via tube bends.

An object of the present invention is to make available a structurally simple tubular reactor, which can be used for the implementation of highly differing and not specific types of reactions. In addition, an object of the present invention is also to make a tubular reactor available in which the reactor length can be varied, in a preselected fashion, to match the required reaction time and/or the desired throughput capacity.

A further object of the invention is to provide a tubular reactor, which allows the reaction to occur in a stepped fashion such that additional reaction components can be introduced into the reactor at various locations across the tube length.

A further object of the invention is to provide a tubular reactor in which, in a preselected manner, process-technology measurement data such as temperature, pressure, viscosity and optical properties can be measured as a function of the progress of the reaction. Additionally, samples can be extracted from the reaction medium as a function of the progress of the reaction.

A further object of the invention is to provide a tubular reactor in which the cooling or heating power can be controlled as a function of the longitudinal expanse of the reactor.

A further object of the invention is to provide a tubular reactor which permits the reaction medium to be discharged and reintroduced at an arbitrary location. As a result, the temporarily discharged reaction medium can be conveyed, during the discharge time, through a separate heat exchanger with increased cooling or heating power, to temporarily obtain a higher or lower reaction temperature or to regulate the temperature of a more highly exothermic or endothermic reaction stage.

A further object of the invention consists of providing a tubular reactor which can be simply cleansed of impurities and deposits on the tube walls.

DETAILED DESCRIPTION OF THE INVENTION

The present invention comprises a tubular reactor which contains a plurality of reaction tubes held in parallel between at least two tube 0plates, wherein the reaction tubes are connected outside the tube plates by means of tube bends to form a tubular coil. Preferably, the tube bends are U-Shaped (180°) in form. Additionally, at least a number of the tube bends are preferably connected to adjacent tube ends by means of releasable flange connections.

Preferably, the parallel reaction tubes are arranged in a manner such that on the tube plates, the reaction tubes form a regular grid in the form of a square or more preferably, an isosceles triangle. Preferably, in each case, at least one group of four tubes is provided with releasable flange connections at least one end, wherein within each group, the tubes are connected in pairs via tube bends.

Figure 1:
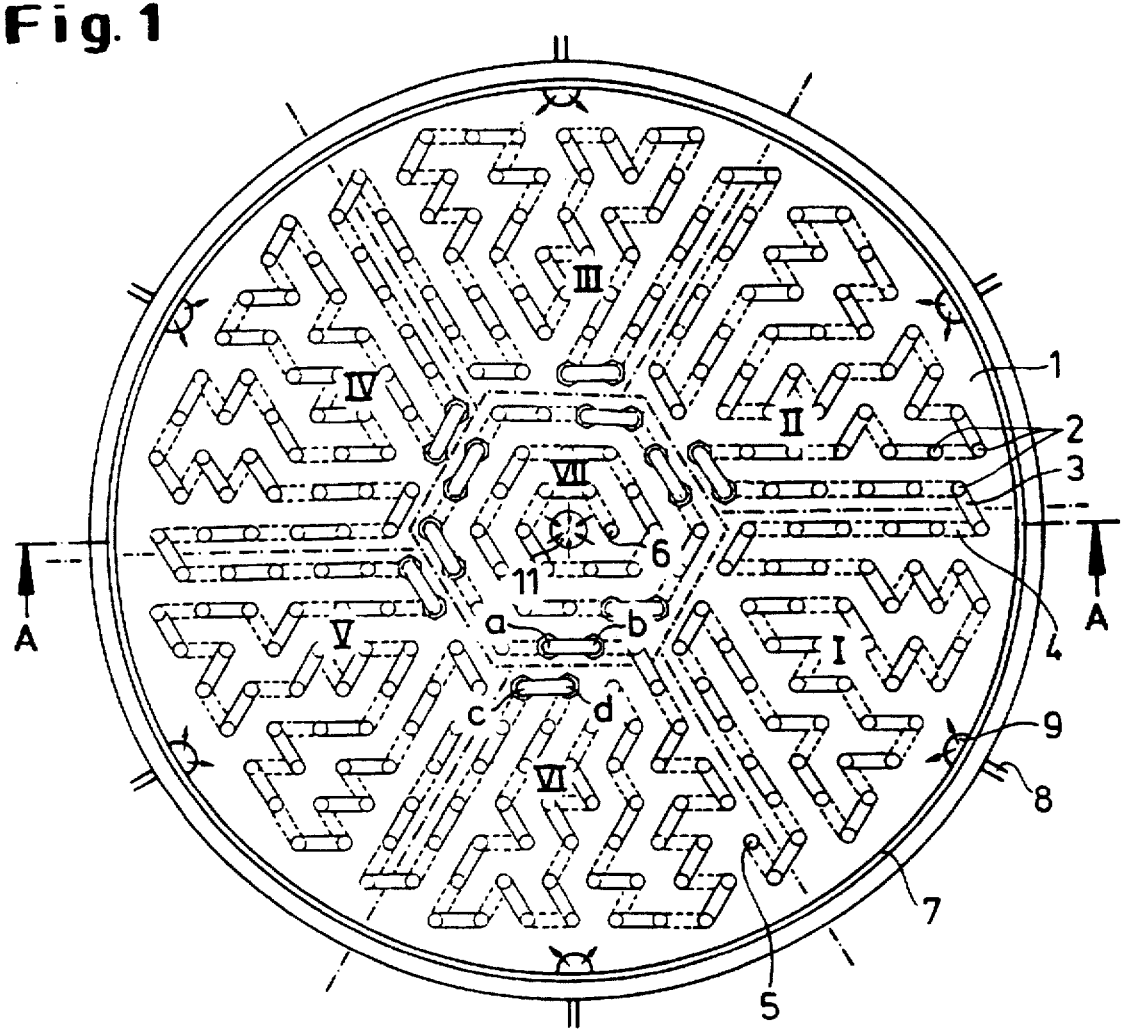
FIG. 1 illustrates a plan view of a tubular reactor of the present invention in which reaction tubes in adjacent sectors are consecutively traversed by the flow.
Figure 2:
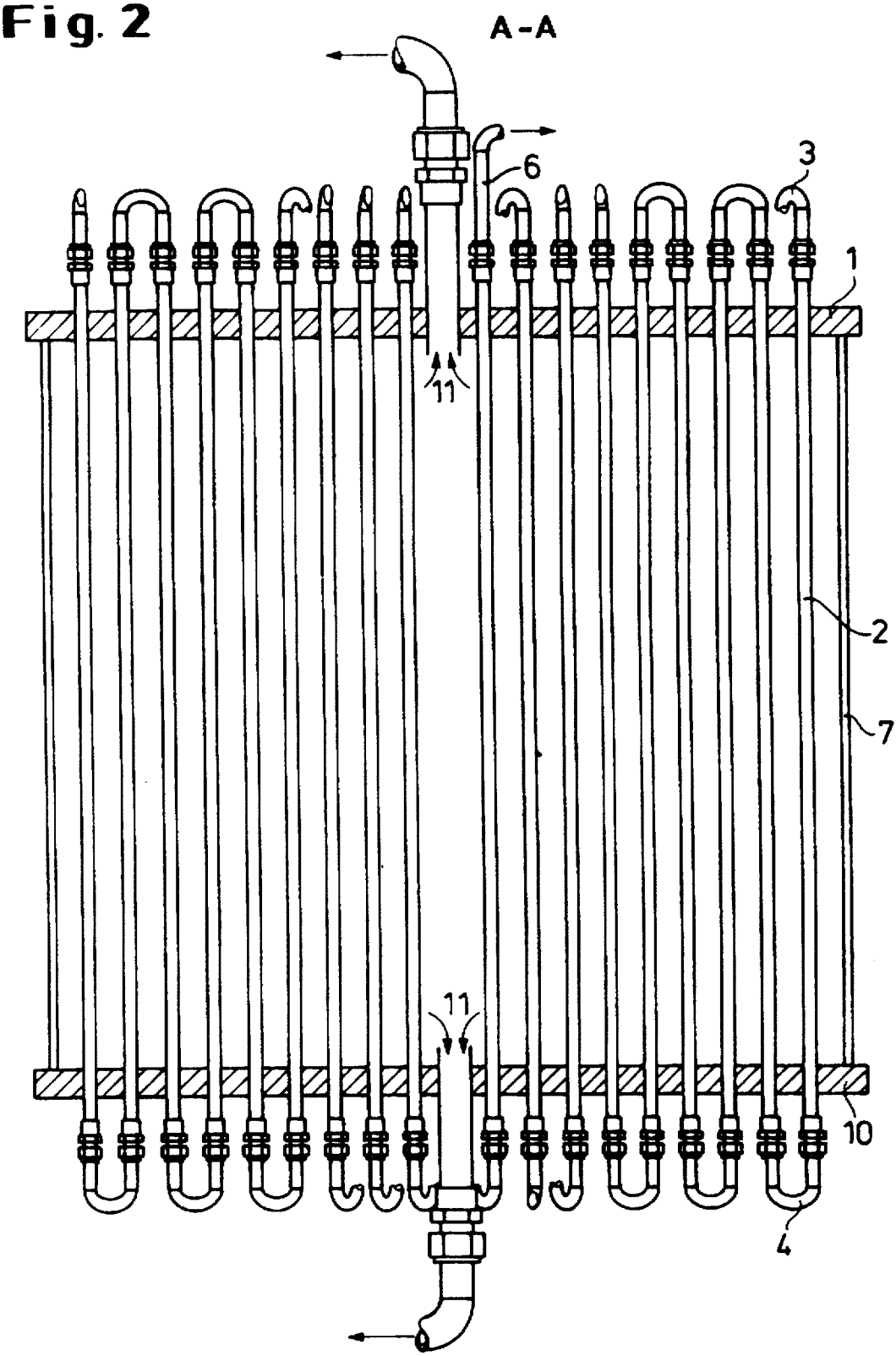
FIG. 2 illustrates a cross-sectional view of the tubular reactor as indicated by the lines and arrows A—A, which appear in FIG. 1.

As shown in FIGS. 1 and 2, the two tube plates 1 and 10 are penetrated by a plurality of reaction tubes 2, which form a regular grid in the form of an isosceles triangle on each tube plate. The reaction tubes 2 are connected by tube bends 3 and 4.

In accordance with the present invention, the effective length of the tubular reactor can be altered when the flange connections of a group of tubes are released. The tube bends may then be rotated by 90° or 180° (in the case of a square grid) or by 60°, 120° or 180° (in the case of a triangular grid) around the axis of one tube to which it had been connected, whereby new connections are made, such that a part of the parallel tubes in the tubular reactor is attached thereto or separated therefrom. As a result, a tubular reactor is provided, wherein the length can be changed as a function of the reaction to be performed.

In a preferred embodiment, the inner diameter of the parallel tubes of the tubular reactor can range from 3 to 50 mm. A tube inner diameter of the parallel tube of between 10 and 30 mm is preferred. The length of the parallel tubes, corresponding to approximately the distance between the two tube plates, can range from a length of approximately 1 to 6 m. Additionally, the tubular reactor of the present invention comprises between 100 to 500 parallel tubes, such that the tubular reactor has an axial length ranging from 100 to 6000 m. As a result, dwell times of between 20 seconds and 100 minutes can be obtained for liquid reaction media with flow speeds of 1 to 5 m per second, which are required to produce a plug flow.

In addition, the tubular reactor of the present invention possesses a casing which connects the tube plates and is parallel to the individual tubes such that the parallel tubes are enclosed in a cylindrical container. The cylindrical container is preferably supplied with a liquid cooling or heating medium which enables the temperature of the tubular reactor to be regulated.

Preferably, the tube plates are divided into segments, wherein the reaction tubes associated with each segment are connected to the tube bends in such a manner that the reaction tubes are consecutively traversed by the reaction medium. In the case of circular tube plates, a central segment is preferably formed having a diameter corresponding to 30 to 50% of the tube plate diameter. In a most preferred embodiment, the central segment is approximately one third (⅓) of the tube plate diameter.

As shown in FIG. 1, the reaction medium is introduced into the tubular reactor through a reaction tube 5 and flows consecutively through tubes of sectors I to VI indicated by dash-dotted lines and into the central sector VII until the reaction medium issues from the last traversed reaction tube 6. The two tube plates 1 and 10 are connected by a cylindrical outer wall 7 to form a cooling medium container. The cooling medium container is supplied (9) with cooling medium via coolant medium supply lines 8, which are assigned to each sector I to VI. The cooling medium is controlled individually in each sector with respect to quantity and temperature. Finally, the cooling medium is discharged via discharge tubes 11, which are arranged centrally on the tube plates.

Outside of the central segment, preferably 4 to 8 peripheral segments of approximately equal size, which correspond to the sectors of the tube plate, are formed. By reversing the flange connections of two adjacent tube bends, wherein one tube bend is assigned to the central segment and the other tube bend is assigned to a peripheral segment, it is possible to attach to, or separate from the tubular reactor, a number of reaction tubes corresponding to the number of reaction tubes in one or more segments. For purposes of simplification, FIG. 1 illustrates only a number of the tube bends with flanges.

To reduce the length of the tubular reactor, the example in FIG. 1 shows that the tube bends connecting the reaction tubes a and b and the reaction tubes c and d can be released. A tube bend, which connects reaction tubes a and c can be flange-attached. Accordingly, the remaining reaction tubes in sector VI, from reaction tube d and on, can be disconnected from the tubular reactor. As a result, the tubular reactor, which originally contained a total of 312 reaction tubes can be reduced to a total of 272 reaction tubes and the length of the overall reactor is also shortened.

Preferably, the supply of the heating or cooling medium through the cylindrical outer wall of the container containing the reaction tubes takes place through a plurality of inlet openings, wherein each peripheral segment is assigned to one or more inlet openings. The discharge of the cooling or heating medium preferably takes place in the axis of the tube plates.

To improve the supply in each sector with cooling medium, guide plates can further be provided along the radial dash-dotted lines shown in FIG. 1, which prevent the mixing of cooling medium supplied to adjacent sectors as arranged within the reactor container. Additionally, in the central segment VII, baffles can be provided, which promote a cooling medium flow rotating about the cooling medium outlet 11. As a result, the cooling mediums which flow from different peripheral sectors and enter the central segment VII, are mixed.

In another preferred embodiment, at least some of the tube bends, which connect the reaction tubes, are provided with measuring devices for monitoring process parameters within the tubular reactor as a function of the progress of the reaction. Accordingly, parameters such as the reaction temperature, the reaction pressure, the viscosity and the optical properties of the reaction mass, etc., are measured within the tube bends.

Additionally, in another preferred embodiment, individual tube bends can be provided with outlet valves for the extraction of samples. Furthermore, some of the tube bends may comprise inlet devices for the feeding-in of additional reaction partners, resulting in the tubular reactor of the present invention being suitable for the implementation of multi step reactions.

In another preferred embodiment of the present invention, the feed-in devices for the cooling or heating medium comprise individual regulating devices for the temperature and/or the flow of the cooling or heating medium, such that the parallel reaction tubes assigned to the different segments can be acted upon by differing cooling or heating power.

As a result of the above-mentioned embodiments, a tubular reactor of the present invention may comprise a cylindrical container, two end faces which have the form of tube plates and also the following: the container comprises a plurality of reaction tubes parallel to the cylinder axis which pass through the tube plates and transversely to the axis of the tube plates to form a regular grid, wherein, two tube ends are connected to each other by a tube bend. Additionally, at least a part of the tube bends are flange-attached in a releasable fashion. Next, the cylindrical container is divided into a plurality of axially parallel segments, wherein the tubes of each segment are connected by tube bends in a manner such that a tubular coil is formed in each segment. The first and last tubes are adjacent to the last and first tubes, respectively, of the tubular coils of two adjacent segments. Furthermore, for each segment, at least one coolant inlet, which comprises a control means for the temperature and/or the flow of the coolant supplied to this segment, is provided over the casing of the container and is controllable as a function of the measured temperature. Additionally, at least one tube bend of each segment possesses a temperature measuring device in which the temperature and/or flow of the coolant supplied to this segment is controllable as a function of the measured temperature. Preferably, the discharge of the coolant takes place in the axis of the cylindrical container. Preferably, the total quantity of the supplied cooling medium is controlled through dependence upon the temperature of the reaction medium in a tube bend close to the axis.

For the implementation of reactions in which heat is released, the heat decreases approximately exponentially in the course of the reaction and is generally the case with one-step reactions, a tubular reactor of the present invention with co-current cooling can be constructed as follows; see FIG. 3. First, the reaction tubes, which are arranged externally in the cylindrical container, are connected consecutively to one another by tube bends resulting in a tubular coil wound around the axis of the cylindrical container. The cooling medium is supplied to the container through a series of inlets arranged on the cylindrical outer container and is discharged in the container axis. By controlling the temperature of the cooling medium at the respective inlet as a function of the assigned temperature measuring devices in the tube bends, which are distributed in each sector, and also through control of the total quantity of supplied cooling medium as a function of the temperature in a tube bend adjacent to the outlet, a decrease in temperature can be set resulting from the temperature decrease in the reaction medium inlet to the outlet, both peripherally and radially, to correspond with a temperature difference of the reaction medium, which corresponds to the heat development in the respective reaction tube.

If each inlet opening for the reaction medium is assigned a plurality of radially distributed temperature measuring devices, and temperature measurement values are assigned to a microprocessor control system for the coolant temperature and coolant quantity, it is possible to radially control the cooling power in such a manner that only small temperature fluctuations of a few °C. occur in the tubular reactor of the present invention.

As a result of its compact construction, the tubular reactor of the present invention is also suitable for use as a tubular reactor module, either upstream or downstream of which further reactor modules can be connected. For example, the reaction mixture, which leaves the tubular reactor, can be supplied to a thin-layer vaporizer in which any solvent used is vaporized. It is also possible to employ a plurality of the presently invented tubular reactors in parallel and in series. For example, it may be necessary, in view of the changes in viscosity of the reaction mass in order to maintain a plug flow and when the reaction has progressed to a certain extent, to transfer the reaction mass into a reactor having reactor tubes with relatively larger or smaller diameters. For specific reactions, it is expedient that two identical tubular reactors with reaction tubes having a first diameter be operated in parallel until the reaction has progressed to a specific extent and then to switch over to a rearwardly connected tubular reactor comprising reaction tubes having a larger diameter.

Furthermore, the tubular reactor of the present invention allows a tube bend to be replaced by an outward flow to and a return flow from a further reactor with a different characteristic and to act as an intermediate stage, to obtain drastically altered reaction conditions. Intermediary subflow treatments can also be obtained if a tube bend is provided with tube branches preferably having valves that may be regulated.

In a preferred tubular reactor according to the invention, all of the tube bends, which connect the reaction tubes, are connected to the reaction tubes by releasable flanges. Such flanges allow the reaction tubes to be connected to one another virtually in an arbitrary sequence and thus, to achieve a temperature regulation adapted to the course of the special reaction to be implemented.

The inner diameter of the tube bends can be selected independently of the inner diameter of the reaction tubes. In particular, the inner diameter of the tube bends can be more narrow than the inner diameter of the reaction tubes, such that the dwell time outside of the coolant container can optionally be shortened as a result of the increase in flow speed. Furthermore, an increased flow speed in the tube bends also serves to prevent deposits which may occur mainly in the tube bends.

When reactions are carried out in a liquid medium with an increase in viscosity, one or more of the tube bends can be replaced by a feed pump which results in the pressure level at the inlet of the tubular reactor remaining at a lower level.

In controlling the temperature, temperature measuring sensors are provided in one or more tube bends assigned to a sector. As a function of the measurement values of these sensors, the cooling medium quantity supplied to the respective sector and the temperature are controlled, preferably following processing in a microprocessor.

Although the control of the cooling power does not act directly upon an individual reaction tube, but in each case takes into consideration, optionally in a different manner, the reaction tubes assigned to a sector, it has been found that temperature control with only minor fluctuations can be achieved as the dwell time in each reaction tube is only on the order of one second or less.

Figure 3:
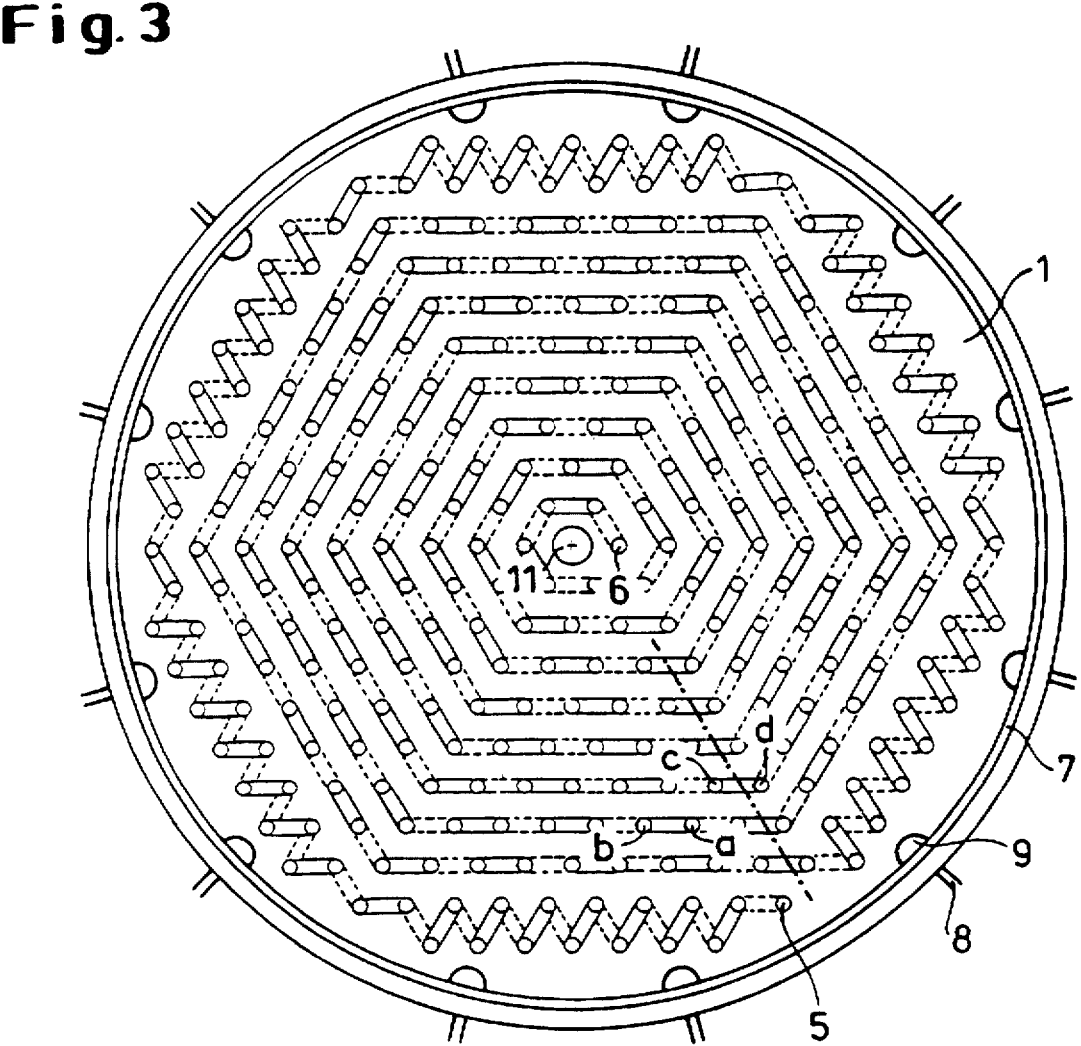
FIG. 3 illustrates a plan view of a tubular reactor of the present invention in which the individual reaction tubes are connected by an appropriate arrangement of the tube bends such that a wound tubular coil results.

FIG. 3 illustrates a tubular reactor of the present invention, as shown in FIG. 1, but with a different arrangement of the tube bends, such that the projection of the tube bends into a plane at right angles to the axis results in a spiral formation. The reference symbols in FIG. 3 in each case designate corresponding elements as in FIG. 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A tubular reactor comprising a plurality of reaction tubes held in parallel between two tube plates, wherein said plurality of reaction tubes are connected outside of said tube plates by 180° tube bends to form a tubular coil; at least one said tube bend is connected to a tube end of said reaction tube by a releasable flange connection.

2. A tubular reactor according to claim 1, wherein said plurality of reaction tubes between said tube plates are enclosed in a container which can be supplied with a cooling medium or heating medium.

3. A tubular reactor according to claim 1, wherein at least one said tube bend comprises at least one measuring probe for detecting the status values of the contents of a reaction medium of said reaction tube.

4. A tubular reactor according to claim 2, wherein at least one said tube bend comprises at least one measuring probe for detecting the status values of the contents of a reaction medium of said reaction tube.

5. A tubular reactor according to claim 1, wherein at least one group of said reaction tubes are connected by said tube bends such that said reaction tubes are consecutively connected to one another in a through-flow relationship, and that at least one group of said reaction tubes are assigned inlet elements for said cooling medium wherein the flow and temperature of said cooling medium is controlled as a function of the temperature of said reaction medium in one or more said tube bends assigned to said group of said reaction tubes.

6. A tubular reactor according to claim 2, wherein at least one group of said reaction tubes are connected by said tube bends such that said reaction tubes are consecutively connected to one another in a through-flow relationship, and that at least one group of said reaction tubes are assigned inlet elements for said cooling medium wherein the flow and temperature of said cooling medium is controlled as a function of the temperature of said reaction medium in one or more said tube bends assigned to said group of said reaction tubes.

7. A tubular reactor according to claim 3, wherein at least one group of said reaction tubes are connected by said tube bends such that said reaction tubes are consecutively connected to one another in a through-flow relationship, and that at least one group of said reaction tubes are assigned inlet elements for said cooling medium wherein the flow and temperature of said cooling medium is controlled as a function of the temperature of said reaction medium in one or more said tube bends assigned to said group of said reaction tubes.

8. A tubular reactor according to claim 4, wherein at least one group of said reaction tubes are connected by said tube bends such that said reaction tubes are consecutively connected to one another in a through-flow relationship, and that at least one group of said reaction tubes are assigned inlet elements for said cooling medium wherein the flow and temperature of said cooling medium is controlled as a function of the temperature of said reaction medium in one or more said tube bends assigned to said group of said reaction tubes.

9. A tubular reactor according to claim 5, wherein said groups of said reaction tubes are formed which are assigned to 4 to 12 peripheral sectors and to a central sector of said tube plate; said cooling medium supply takes place through an outer cooling medium container wall of said container by cooling medium inlet elements assigned to each said peripheral sector, and said cooling medium is discharged by a central cooling medium discharge element.

10. A tubular reactor according to claim 1, wherein said reaction tubes are connected by said tube bends such that the structure of a wound cooling coil is formed.

11. A tubular reactor according to claim 1, wherein at least one of said tube bends comprises sample extraction devices.

12. A tubular reactor according to claim 1, wherein at least one of said tube bends comprises a feed-in device for additional reaction partners.

13. A tubular reactor according to claim 1, wherein at least one of said tube bends comprises a conveying device for the reaction medium.

14. A tubular reactor according to claim 2, wherein said reaction tubes are connected by said tube bends such that the structure of a wound cooling coil is formed.

15. A tubular reactor according to claim 3, wherein said reaction tubes are connected by said tube bends such that the structure of a wound cooling coil is formed.

\* \* \* \* \*